United States Patent
Kawahara et al.

(10) Patent No.: US 8,676,038 B2
(45) Date of Patent: Mar. 18, 2014

(54) RECORDING/REPRODUCING APPARATUS, RECORDING APPARATUS, REPRODUCING APPARATUS, RECORDING METHOD, REPRODUCING METHOD AND COMPUTER PROGRAM

(75) Inventors: Minoru Kawahara, Kanagawa (JP); Kenji Yamasaki, Kanagawa (JP)

(73) Assignee: Sony Corporation (JP)

( * ) Notice: Subject to any disclaimer, the term of this patent is extended or adjusted under 35 U.S.C. 154(b) by 1194 days.

(21) Appl. No.: 12/215,356

(22) Filed: Jun. 26, 2008

(65) Prior Publication Data

US 2009/0010615 A1 Jan. 8, 2009

(30) Foreign Application Priority Data

Jul. 5, 2007 (JP) ................ P2007-177363

(51) Int. Cl.
*H04N 5/92* (2006.01)

(52) U.S. Cl.
USPC .......................................... 386/326; 386/285

(58) Field of Classification Search
USPC .......................................... 386/326; 375/354
See application file for complete search history.

(56) References Cited

U.S. PATENT DOCUMENTS

| 5,969,755 | A | 10/1999 | Courtney |
| 6,173,113 | B1 * | 1/2001 | Okada et al. ................ 386/240 |
| 7,245,665 | B2 * | 7/2007 | Ueda et al. ............... 375/240.28 |
| 2003/0128766 | A1 * | 7/2003 | Tahara et al. ............ 375/240.26 |
| 2005/0052338 | A1 * | 3/2005 | Suzuki et al. ................. 345/1.1 |
| 2006/0245726 | A1 | 11/2006 | Mizuno |
| 2007/0036521 | A1 * | 2/2007 | Date et al. ....................... 386/95 |
| 2007/0052847 | A1 * | 3/2007 | Yamada ........................ 348/468 |

FOREIGN PATENT DOCUMENTS

| EP | 1170747 | 1/2002 |
| EP | 1310957 | 5/2003 |
| JP | 05-282380 A | 10/1993 |
| JP | 10-084525 A | 3/1998 |
| JP | 11-261963 A | 9/1999 |
| JP | 11-355722 A | 12/1999 |
| JP | 2003-173625 A | 6/2003 |
| JP | 2004-007648 A | 1/2004 |
| JP | 2005-038516 A | 2/2005 |
| JP | 2007-020195 A | 1/2007 |

OTHER PUBLICATIONS

Communication from corresponding European Application 08251998, dated Jul. 8, 2009.
European Search Report, EP 08 25 1998.

* cited by examiner

*Primary Examiner* — Peter Shaw
*Assistant Examiner* — Ali Shayanfar
(74) *Attorney, Agent, or Firm* — Lerner, David, Littenberg, Krumholz & Mentlik, LLP

(57) ABSTRACT

There is provided a recording/reproducing apparatus that includes an image recording unit for recording moving picture, an audio recording unit for recording audio, a reproduction information recording unit for recording in parallel, at the time of recording moving picture and audio, reproduction information of moving picture and audio, and a reproducing unit reproducing moving picture and audio based on reproduction information, wherein the reproduction information recording unit records, for each chunk of audio data, audio synchronization information for synchronizing video and audio at the time of recording the reproduction information.

3 Claims, 14 Drawing Sheets

| | | | | | | | | |
|---|---|---|---|---|---|---|---|---|
| FILE HEADER | | | | | | | | |
| EXTENDED FILE HEADER | | | | | | | | |
| FRAME 0 | 1 | B | sizeV[0] | offsV[0] | delA[0] | 0 | sizeA[0] | offsA[0] |
| FRAME 1 | 0 | B | sizeV[1] | offsV[1] | delA[1] | 0 | sizeA[1] | offsA[1] |
| FRAME 2 | 0 | I | sizeV[2] | offsV[2] | delA[2] | 0 | sizeA[2] | offsA[2] |
| | 0 | B | : | : | : | : | : | : |
| | 0 | B | : | : | : | : | : | : |
| | 0 | P | : | : | : | : | : | : |

| | | | | | | | |
|---|---|---|---|---|---|---|---|
| FILE HEADER | | | | | | | |
| EXTENDED FILE HEADER | | | | | | | |
| FRAME 0 | 1 | B | sizeV[0] | offsV[0] | delA[0] | 3 | sizeA[0] | offsA[0] |
| FRAME 1 | 0 | B | sizeV[1] | offsV[1] | 0 | 2 | 0 | 0 |
| FRAME 2 | 0 | I | sizeV[2] | offsV[2] | 0 | 2 | 0 | 0 |
| | 0 | B | : | : | : | 2 | : | : |
| | | | | | | | | |
| FRAME 14 | 0 | F | sizeV[14] | offsV[14] | 0 | 2 | 0 | 0 |
| FRAME 15 | 1 | B | sizeV[15] | offsV[15] | delA[15] | 3 | sizeA[15] | offsA[15] |
| FRAME 16 | 0 | B | sizeV[16] | offsV[16] | 0 | 2 | 0 | 0 |
| FRAME 17 | 0 | I | sizeV[17] | offsV[17] | 0 | 2 | 0 | 0 |

FIG.14

1 Audio Pack

1 PES

FIG.15

```
         |       x       |
··· XX | 47 48 10 1E | 00 00 01 E0 ···
0
   |—— offsV[ ] ——|—— sizeV[ ] ——|
```

FIG.16

| | | | | | | | |
|---|---|---|---|---|---|---|---|
| FILE HEADER | | | | | | | |
| EXTENDED FILE HEADER | | | | | | | |
| FRAME 0 | 1 | B | sizeV[0] | offsV[0] | delA[0] | 3 | sizeA[0] | offsA[0] |
| FRAME 1 | 0 | B | sizeV[1] | offsV[1] | 0 | 2 | 0 | 0 |
| FRAME 2 | 0 | I | sizeV[2] | offsV[2] | 0 | 2 | 0 | 0 |
| FRAME 3 | 0 | B | sizeV[3] | offsV[3] | delA[3] | 3 | sizeA[3] | offsA[3] |
| FRAME 4 | 0 | B | sizeV[4] | offsV[4] | 0 | 2 | 0 | 0 |
| ⋮ | ⋮ | ⋮ | ⋮ | ⋮ | ⋮ | ⋮ | ⋮ | ⋮ |

RECORDING/REPRODUCING APPARATUS, RECORDING APPARATUS, REPRODUCING APPARATUS, RECORDING METHOD, REPRODUCING METHOD AND COMPUTER PROGRAM

CROSS-REFERENCE TO RELATED APPLICATION

The present Application claims priority from Japanese Patent Application No. JP 2007-177363 filed in the Japanese Patent Office on Jul. 5, 2007, the entire content of which is incorporated herein by reference.

BACKGROUND OF THE INVENTION

1. Field of the Invention

The present invention relates to a recording/reproducing apparatus, a recording apparatus, a reproducing apparatus, a recording method, a reproducing method and a computer program.

2. Description of the Related Art

In the past, a recording/reproducing apparatus for recording video and audio, such as camcorder, has, along with the basic functions of recording and reproducing, functions of splitting the recorded video and audio and recovering (salvaging) the damaged video/audio file.

There exist various formats for recording video and audio. For examples, RIFF (Resource Interchange File Format), QuickTime, TS (Transport Stream), PS (Program Stream) and MXF (Material Exchange Format) are known. In many cases, format for recording video and audio with a camcorder and format for editing the recorded video and audio are different from each other. To make it possible to edit video and audio even when formats are different, each format also records index information when recording video and audio so that location of video and audio in the recorded file can be identified. (Refer to JP-A-2007-20195, JP-A-H10-84525, JP-A-H5-282380.)

As described above, by recording index information as well, even if format for recording video and audio and format for reproducing and editing the video and audio are different, by referring to the index information, it is possible to reproduce and edit video and audio with different formats.

SUMMARY OF THE INVENTION

However, in related art, it was required to have a separate processor for each format and implement a large number of functions. Although a lot of processed in recording video and audio may be made common, the recording process became redundant as each format requires as many processors. Further, there was a problem that, to deal with a large number of formats, the circuit dimension had to be made large.

Further, in related art, it was impossible to record index information in short intervals to be able to be used for salvaging (recovery of damaged file). Further, since synchronization information of video and audio is located at the header of stream, when it is desired to, for example, reproduce a stream from an arbitrary point, a problem arose that integration must be carried out over elapsed time from the beginning of the index, which makes the processing time-consuming.

The present invention has been developed in view of the above problems, and provides a new and improved recording/reproducing apparatus, a new and improved recording apparatus, a new and improved reproducing apparatus, a new and improved recording method, a new and improved reproducing method and a new and improved computer program, which enable multiple functions to be realized based on the recorded index information by recording index information with common format regardless of recording formats, and by recording information for synchronizing video and audio in the index information at the time of recording video and audio.

According to an embodiment of the present invention, there is provided a recording/reproducing apparatus that includes an image recording unit for recording moving picture, an audio recording unit for recording audio, a reproduction information recording unit for recording information for reproducing the moving picture and the audio together with, at the time of recording the moving picture and the audio, and a reproducing unit for reproducing the moving picture and audio based on the reproduction information, wherein the reproduction information recording unit records, for each chunk of audio data, audio synchronization information for synchronizing video and audio, in parallel with the reproduction information at the time of recording the reproduction information.

With the above structure, a recording/reproducing apparatus includes an image recording unit for recording moving picture, an audio recording unit for recording audio, a reproduction information recording unit for recording information for reproducing the moving picture and the audio together with, at the time of recording the moving picture and the audio, and a reproducing unit for reproducing the moving picture and audio based on the reproduction information, and the reproduction information recording unit records, for each chunk of audio data, audio synchronization information for synchronizing video and audio, in parallel with the reproduction information at the time of recording the reproduction information. As a result, by recording index information containing information for synchronizing video and audio with common format regardless of recording formats, it is made possible to realize many functions based on the recorded index information.

The reproducing unit may synchronously reproduce the moving picture and the audio based on audio synchronization information recorded for each chunk of the audio data. As a result, by using the audio synchronization information for synchronizing the video and the audio recorded for each chunk of the audio data, it is made possible to synchronously reproduce the moving picture and the audio.

According to another embodiment of the present invention, there is provided a recording apparatus that includes an image recording unit for recording moving picture, an audio recording unit for recording audio, and a reproduction information recording unit for recording information for reproducing the moving picture and the audio together with, at the time of recording the moving picture and the audio, wherein the reproduction information recording unit records, for each chunk of audio data, audio synchronization information for synchronizing video and audio, in parallel with the reproduction information at the time of recording the reproduction information.

With the above structure, a recording apparatus includes an image recording unit for recording moving picture, an audio recording unit for recording audio, and a reproduction information recording unit for recording information for reproducing the moving picture and the audio together with, at the time of recording the moving picture and the audio, wherein the reproduction information recording unit records, for each chunk of audio data, audio synchronization information for synchronizing video and audio, in parallel with the reproduction information at the time of recording the reproduction information. As a result, by recording index information containing information for synchronizing video and audio with common format regardless of recording formats, it is made possible to realize many functions based on the recorded index information.

According to another embodiment of the present invention, there is provided a reproducing apparatus that includes a reproducing unit for reproducing moving picture and audio based on the information for reproducing the moving picture and the audio together with, at the time of recording the moving picture and the audio, when reproducing the moving picture and the audio, wherein the reproducing unit synchronously reproduces the moving picture and the audio based on audio synchronization information contained in the reproduction information for synchronizing the moving picture and the audio recorded in parallel with the reproduction information for each chunk of audio data.

With the above structure, a reproducing apparatus includes a reproducing unit for reproducing moving picture and audio based on the information for reproducing the moving picture and the audio recorded together with, at the time of recording the moving picture and the audio, when reproducing the moving picture and the audio, wherein the reproducing unit synchronously reproduces the moving picture and the audio based on audio synchronization information contained in the reproduction information for synchronizing the moving picture and the audio. As a result, by using audio synchronization information for synchronizing video and audio recorded in parallel with the reproduction information for each chunk of audio data, it is made possible to synchronize and reproduce moving picture and audio.

According to another embodiment of the present invention, there is provided a recording method that includes an image recording step of recording moving picture, an audio recording step of recording audio, and a reproduction information recording step of recording information for reproducing the moving picture and the audio together with, at the time of recording the moving picture and the audio, wherein the reproduction information recording step records, for each chunk of audio data, audio synchronization information for synchronizing video and audio, in parallel with the reproduction information at the time of recording the reproduction information.

With the above structure, an image recording step records moving picture, an audio recording step records audio, and a reproduction information recording step records information for reproducing the moving picture and the audio together with, at the time of recording moving picture recorded in the image recording step and audio recorded in the audio recording step. Also, the reproduction information recording step records, for each chunk of audio data, audio synchronization information for synchronizing video and audio, in parallel with the reproduction information at the time of recording the reproduction information. As a result, by recording index information containing information for synchronizing video and audio with common format regardless of recording formats, it is made possible to realize many functions based on the recorded index information.

According to another embodiment of the present invention, there is provided a reproducing method that includes a reproducing step for reproducing moving picture and audio based on the information for reproducing the moving picture and the audio recorded together with, at the time of recording the moving picture and the audio, when reproducing the moving picture and audio, wherein the reproducing step synchronously reproduces the moving picture and the audio based on audio synchronization information contained in the reproduction information for synchronizing the moving picture and the audio recorded in parallel with the reproduction information for each chunk of audio data.

With the above structure, a reproducing step reproduces moving picture and audio based on the information for reproducing the moving picture and the audio recorded together with, at the time of recording the moving picture and the audio, when reproducing the moving picture and the audio. Also, at the time of reproduction, the reproducing step synchronously reproduces the moving picture and the audio based on audio synchronization information contained in the reproduction information for synchronizing the moving picture and the audio recorded along with the reproduction information for each chunk of audio data. As a result, by using audio synchronization information for synchronizing video and audio recorded for each chunk of audio data, it is made possible to synchronously reproduce moving picture and audio regardless of recording format of the moving picture and audio.

According to another embodiment of the present invention, there is provided a computer program for enabling a computer to execute processing that includes an image recording step for recording moving picture, an audio recording step for recording audio, and a reproduction information recording step for recording information for reproducing the moving picture and the audio together with, at the time of recording the moving picture and the audio, wherein the reproduction information recording step records, for each chunk of audio data, audio synchronization information for synchronizing video and audio, in parallel with the reproduction information at the time of recording the reproduction information.

According to another embodiment of the present invention, there is provided a computer program for enabling a computer to execute processing that includes a reproducing step for reproducing moving picture and audio based on the information for reproducing the moving picture and the audio recorded together with, at the time of recording the moving picture and the audio, when reproducing the moving picture and audio, wherein the reproducing step synchronously reproduces the moving picture and the audio based on audio synchronization information contained in the reproduction information for synchronizing the moving picture and the audio recorded in parallel with the reproduction information for each chunk of audio data.

According to the embodiments of the present invention described above, a new and improved recording/reproducing apparatus, a new and improved recording apparatus, a new and improved reproducing apparatus, a new and improved recording method, a new and improved reproducing method and a new and improved computer program can be provided, with which, at the time of recording video and audio, by recording index information with common format regardless of recording formats, and by recording audio synchronization information for synchronizing video and audio for each chunk of audio data together with the index information, it is made possible to realize many functions based on the recorded index information and audio synchronization information.

BRIEF DESCRIPTION OF THE DRAWINGS

FIG. 14 is an illustration showing in detail the structure of audio data recorded based on MPEG-2 TS standard.

FIG. 15 is an illustration showing an example of data recorded as video and audio data based on MPEG-2 TS standard.

FIG. 16 is an illustration showing a data structure of a reproduction information file generated based on video and audio data recorded based on MPEG-2 TS standard.

DETAILED DESCRIPTION OF THE PREFERRED EMBODIMENTS

Figure 1:
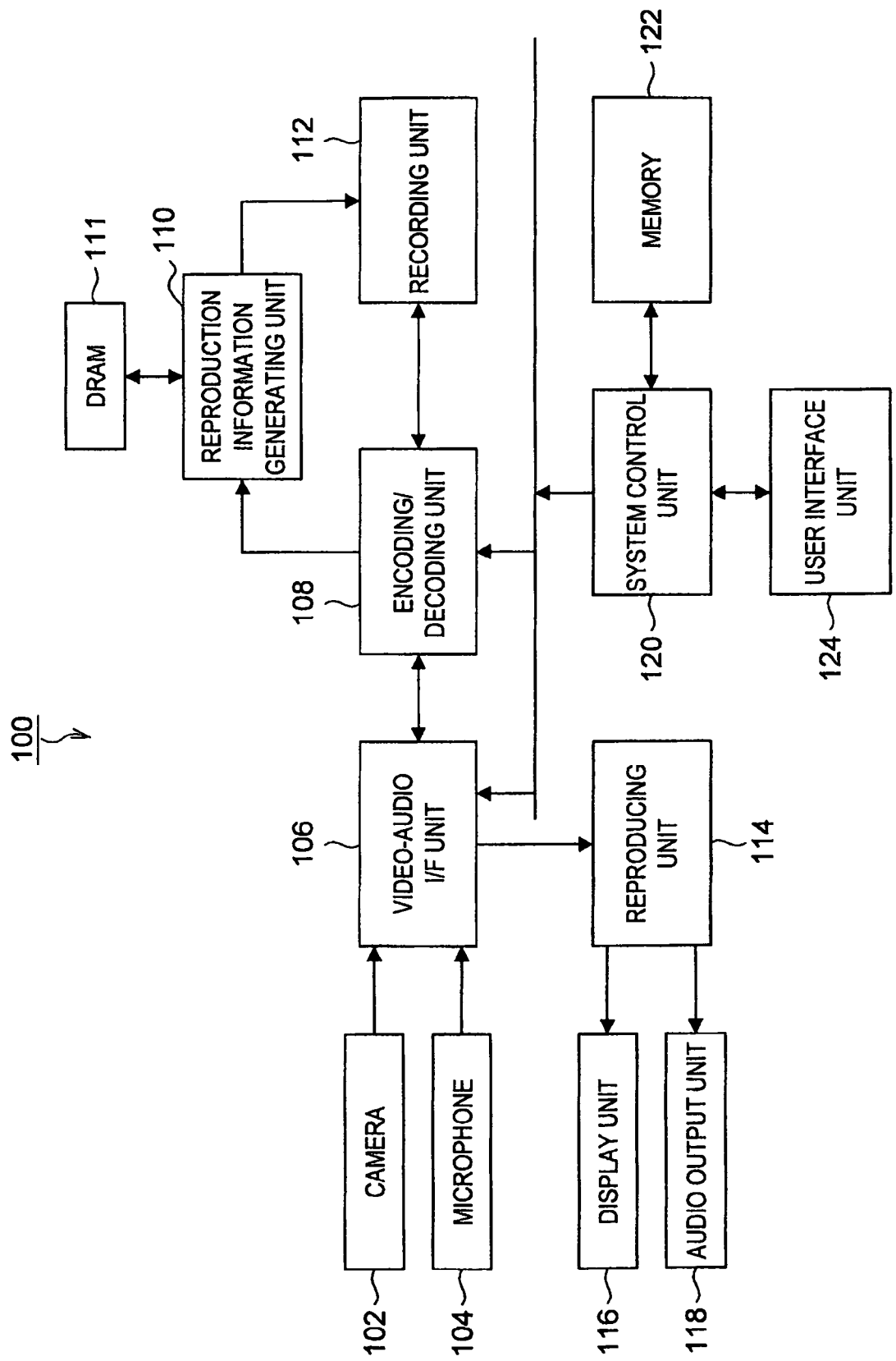
FIG. 1 is an illustration showing a structure adopted in the recording/reproducing apparatus 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

FIG. 1 is an illustration showing a recording/reproducing apparatus 100 according to an embodiment of the present invention. The recording/reproducing apparatus 100 according to an embodiment of the present invention will be described with reference to FIG. 1.

As shown in FIG. 1, The recording/reproducing apparatus 100 according to the embodiment of the present invention is configured to include a camera 102, a microphone 104, a video-audio I/F unit 106, an encoding/decoding unit 108, a reproduction information generating unit 110, a DRAM (Dynamic Random Access Memory) 111, a recording unit 112, are producing unit 114, a display unit 116, an audio output unit 118, a system control unit 120, a memory 122, and a user interface unit 124.

The camera 102 shoots subject as a moving picture or a still picture image, converts the obtained image into digital signal and transmits the digital signal to the video-audio I/F unit 106 as image data. The microphone 104 collects the sound around the recording/reproducing apparatus 100 at the time of the shooting by the camera 102, converts the collected sound into digital data and transmits the digital data to the video-audio I/F unit 106 as audio data.

The video-audio I/F unit 106 transmits the image data shot by the camera 102 and the audio data collected by the microphone 104 to the encoding/decoding unit 108. The video-audio I/F unit 106 also has functions of transmitting the image data from the encoding/decoding unit 108 to the display unit 116, and transmitting the audio data from the encoding/decoding unit 108 to the audio output unit 118.

The encoding/decoding unit 108 encodes the image data and the audio data transmitted from the video-audio I/F unit 106 according to various schemes, and transmits the encoded image data and audio data to the reproduction information generating unit 110 and the recording unit 112. Encoding schemes are, for example, MPEG-1, MPEG-2 and MPEG-4.

The encoding/decoding unit 108 also has functions of reading out image data and audio data recorded in the recording unit 112, decoding the data according to a scheme corresponding to the encoding scheme, and transmitting the decoded image data and audio data to the video-audio I/F unit 106.

The reproduction information generating unit 110 inputs image data and audio data encoded by the encoding/decoding unit 108, and creates a reproduction information file from the image data and the audio data. The structure of the reproduction information file will be described later. The created reproduction information file is transmitted to the recording unit 112 and is recorded therein.

The reproduction information file may be created, when the recording/reproducing apparatus 100 starts recording, by recording the reproduction information sequentially in a reproduction information recoding area included in the DRAM 111, and when the recording/reproducing apparatus 100 ends recording, by creating the reproduction information recorded in the reproduction information recording area as reproduction information file. Recording of the reproduction information into the DRAM 111 is performed at predetermined intervals. The predetermined intervals may be, for example, 2 seconds.

The recording unit 112 records image data and audio data encoded by the encoding/decoding unit 108 in a moving image file format. The recording unit 112 also records the reproduction information file created by the reproduction information generating unit 110 based on image data and audio data encoded by the encoding/decoding unit 108.

The system control unit 120 controls each unit of the recording/reproducing apparatus 100. As an example of control of each unit of the recording/reproducing apparatus 100 by the system control unit 120, the system control unit 120 instructs the camera 102 and the microphone 104 to start recording of image and sound when instructed by the user interface unit 124 to start recording of image. Needless to say, control by the system control unit 120 is not restricted to such example.

The user interface unit 124 accepts operation at an operation unit (not shown) from a user of the recording/reproducing apparatus 100, and transmits the operation signal representing the operation to the system control unit 120. As an example of operation by users, instruction to start recording the moving image, instruction to reproduce the recorded moving image, and the like are conceivable.

The memory 122 stores data needed for processing by each unit of the recording/reproducing apparatus 100. For example, by storing a computer program in the memory 122 and having the system control unit 120 read out and execute the stored computer program, the moving image file may be reproduced.

Heretofore, the structure of the recording/reproducing apparatus 100 according to an embodiment of the present invention has been described with reference to FIG. 1. Next, the internal structure of a reproduction information file generated by the reproduction information generating unit 110 according to an embodiment of the present invention will be described.

Figure 2:
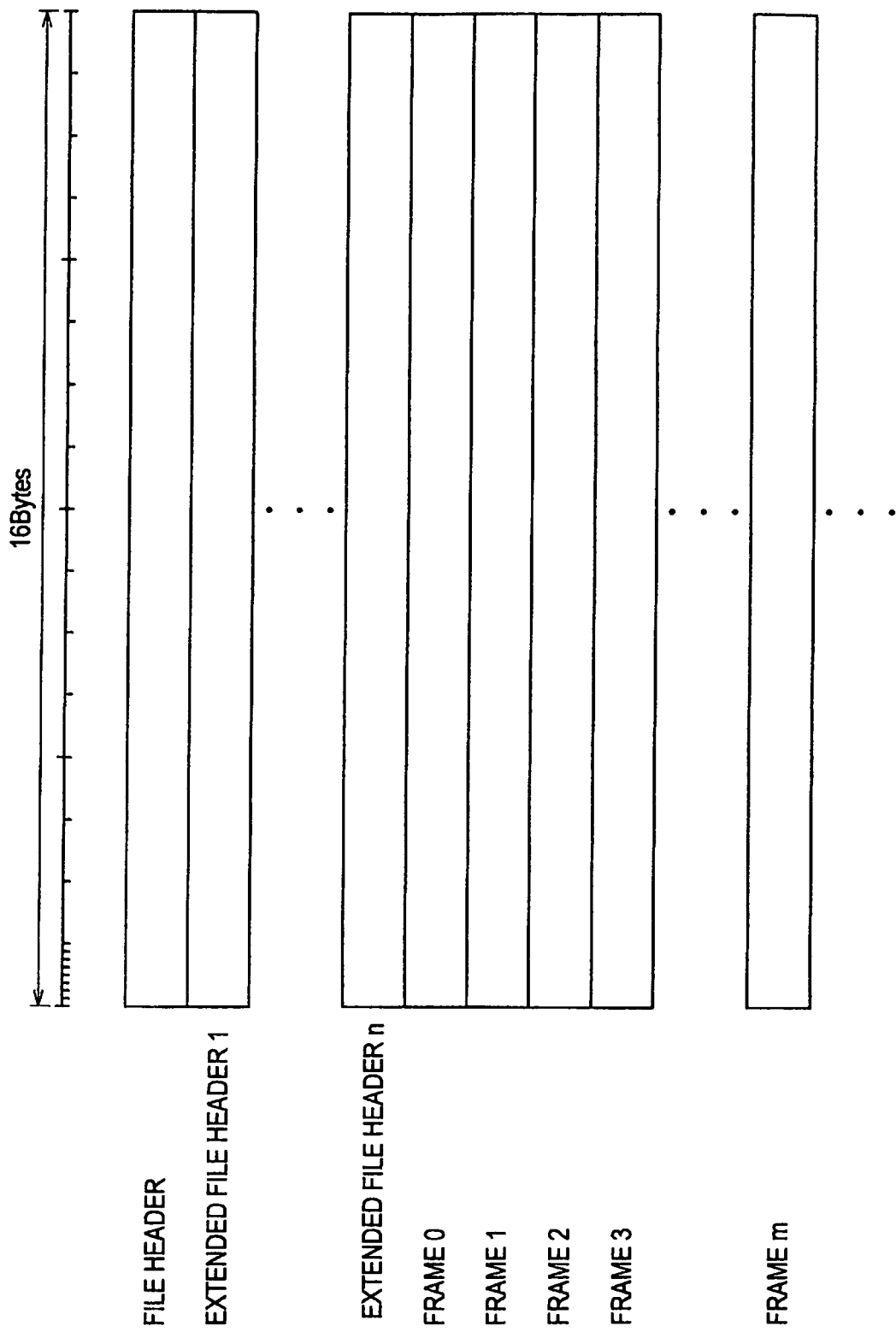
FIG. 2 is an illustration showing an internal structure of a reproduction information file generated by the reproduction information generating unit 110 according to an embodiment of the present invention.

FIG. 2 is an illustration showing an internal structure of a reproduction information file generated by the reproduction information generating unit 110 according to an embodiment of the present invention. Hereinafter, the internal structure of the reproduction information file according to an embodiment of the present invention will be described with reference to FIG. 2.

As shown in FIG. 2, a reproduction information file according to an embodiment of the present invention is configured by 16-byte data as one set. From top of the file, a file header, extended file headers 1 to n, and data corresponding to each frame are stored sequentially.

The file header is an area for basic information relating to image data and audio data recorded by the recording/reproducing apparatus 100. Examples of the basic information relating to image data and audio data to be stored in the file header include version information, basic file information, basic video information, basic audio information and time code information. Needless to say, in the present invention, information to be recorded in the file header is not restricted to such examples.

The extended file header is an area for information relating to image data and audio data recorded by the recording/reproducing apparatus 100 but are not recorded in a file header. According to the present embodiment, in the top portion of the extended file header, number of frames skipped, number of frames to be reproduced, and frame number of representative images to be used in a list of thumbnails are recorded. Needless to say, in the present invention, information to be recorded in the extended file header is not restricted to such examples. Further, number of the extended file header may be 1 or it may be 2 or more. FIG. 2 shows the data structure where the extended file headers of n are provided.

The data corresponding to each frame are information of image data and audio data to be stored in each frame. According to the present embodiment, the information to be stored includes GOP (Group Of Picture) top flag, picture type, video information, audio synchronization information and audio information. As video information, size of image data of each frame and absolute address of image data, for example, are stored. As audio information, size of audio data of each frame and relative address or absolute address of audio data, for example, are stored.

When image data and audio data are recorded by the recording/reproducing apparatus 100, the data corresponding to each frame is created sequentially from 0-th frame (frame 0) based on the recorded data. As frame increases, the data corresponding to the increased frame are appended sequentially to the existing data corresponding to each frame. The data corresponding to each frame are preferably created at predetermined intervals. In the present embodiment, the data corresponding to each frame are created at intervals of 2 minutes.

Heretofore, the internal structure of the reproduction information file according to an embodiment of the present invention has been described with reference to FIG. 2. Next, the data structure of a file header according to an embodiment of the present invention will be described.

Figure 3:
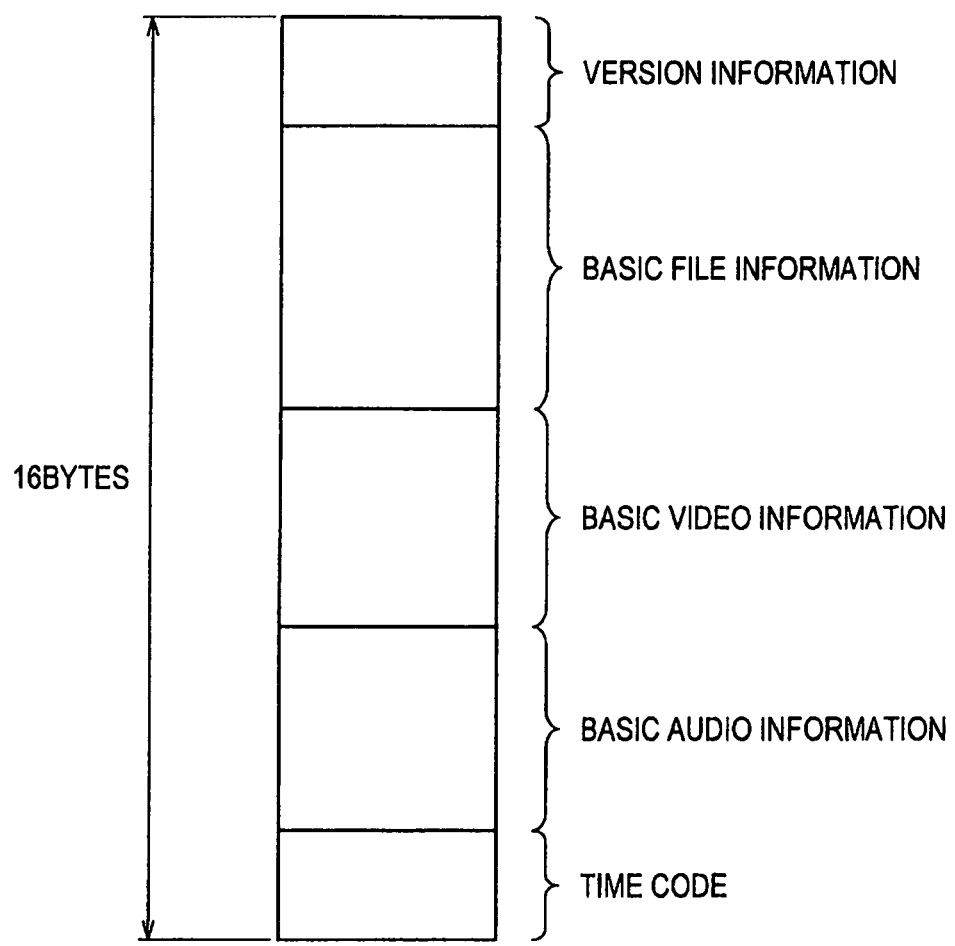
FIG. 3 is an illustration showing a data structure of a file header according to an embodiment of the present invention.

FIG. 3 is an illustration showing a data structure of a file header according to an embodiment of the present invention. Hereinafter, the data structure of a file header according to an embodiment of the present invention will be described with reference to FIG. 3.

As shown in FIG. 3, and also as described above, the file header has an area of 16 bytes. Further, version information, basic file information, basic video information, basic audio information and time code information are recorded in the file header.

Basic file information may include header length of video chunk and header length of audio chunk. Basic video information may include frame rate, aspect ratio of an image, horizontal and vertical pixel size, and video compression standard. Basic audio information may include audio quantization bit number, audio track configuration, audio sampling frequency, and audio compression standard. The area for storing this information is defined to fit into 16 bytes of the file header. Incidentally, the value of the header length of video chunk may differ according to picture types described later, in which case, the data of the header length of video chunk may be stored separately according to the picture types. For example, if the header lengths of video chunk are different for picture type of I-picture and that of other than I-picture, 2 types of values are stored in the basic file information.

Heretofore, the data structure of a file header according to an embodiment of the present invention has been described with reference to FIG. 3. Next, the data structure of data corresponding to each frame according to an embodiment of the present invention will be described.

Figure 4:
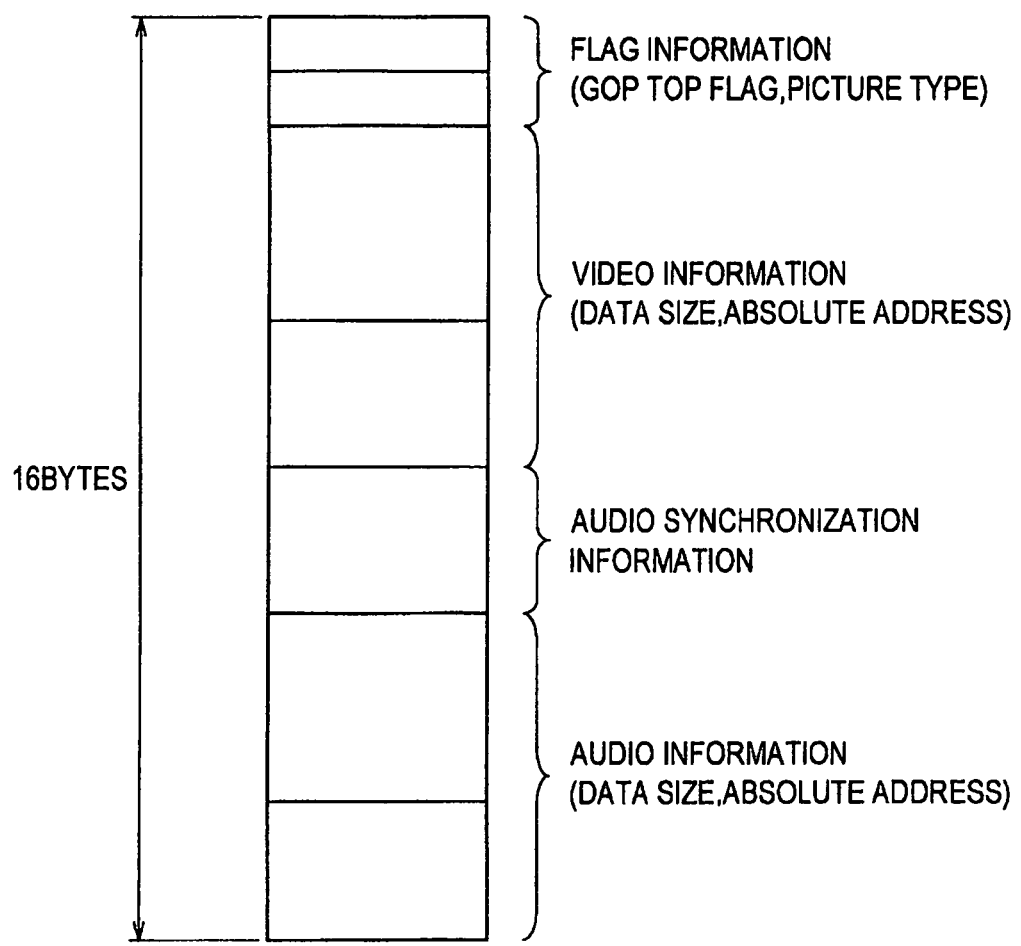
FIG. 4 is an illustration showing a data structure of data corresponding to each frame according to an embodiment of the present invention.

FIG. 4 is an illustration showing a data structure of data corresponding to each frame according to an embodiment of the present invention. Hereinafter, the data structure of data corresponding to each frame according to an embodiment of the present invention will be described with reference to FIG. 4.

As shown in FIG. 4, and also as described above, the data corresponding to each frame has an area of 16 bytes. The data corresponding to each frame may include GOP (Group Of Picture) top flag, picture type, video information, audio synchronization information and audio information. Also, video information may include size of image data of the frame and absolute address of image data. Audio information may include size of audio data of the frame and relative address or absolute address of audio data. Audio synchronization information may include difference value between time information of image data and time information of audio data. The area for storing this information is defined to fit into 16 bytes of the data corresponding to each frame.

By storing GOP top flag or picture type as data corresponding to each frame, even when reproduction is started from a point in the middle of a frame, by reading the reproduction information corresponding to a frame the reproduction of which is to be started, image data of the frame and frames preceding and succeeding the frame can be read and decoded.

Heretofore, the data structure of data corresponding to each frame according to an embodiment of the present invention has been described with reference to FIG. 4. Incidentally, the data structures shown in FIGS. 3 and 4 are examples of the present invention, and needless to say, the location of each data stored is not restricted to those shown in FIGS. 3 and 4.

Next, a method for generating a reproduction information file to be generated by the reproduction information generating unit 110 according to an embodiment of the present invention will be described.

Figure 5:
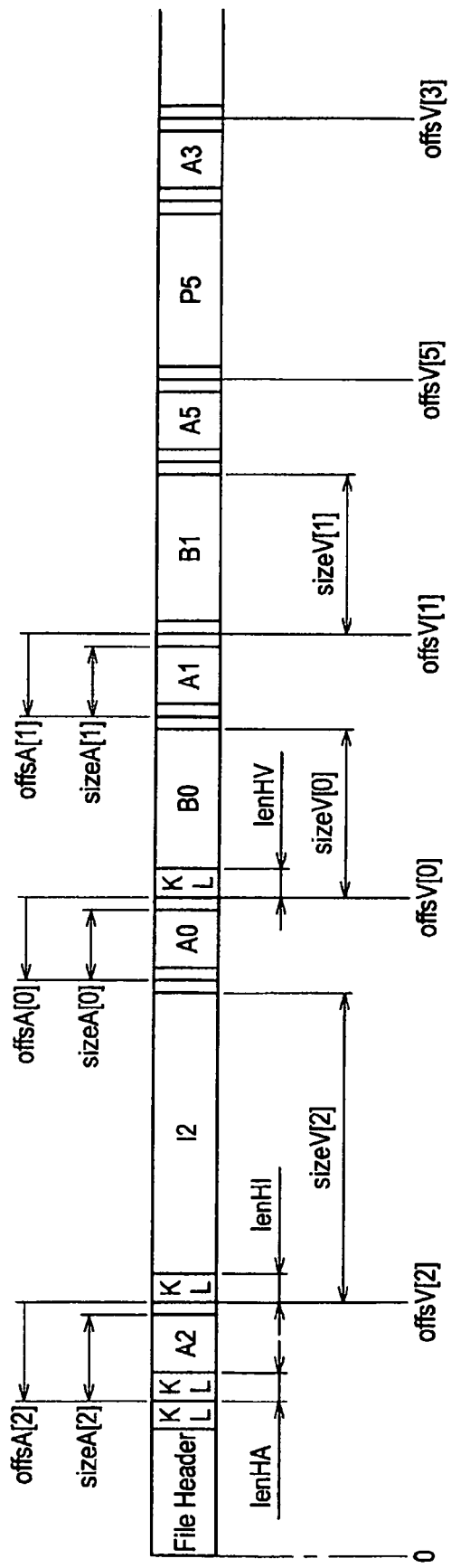
FIG. 5 is an illustration showing an example of the structure of video and audio data recorded based on MXF.

FIG. 5 is an illustration showing an example of the structure of video and audio data recorded based on MXF (Material Exchange Format). As shown in FIG. 5, in MXF, audio data (A0, A1, A2, . . . ) and image data (B0, B1, I2, . . . , P5, . . . ) are recorded mixedly. Here, B, I and P respectively indicate picture types, and B0 indicates that the picture type is B and that it is the 0-th frame. Further, image data is recorded with different size for each frame.

In FIG. 5, "lenHA" indicates the header length of audio chunk, "lenHI" indicates the header length of video chunk of video frame whose picture type is I-picture, and "lenHV" indicates the header length of video chunk of video frame whose picture type is other than I-picture, respectively. Further, "sizeV[n]" indicates the size of video data of the n-th frame, "offsV[n]" indicates the address of video data of the n-th frame, "sizeA[n]" indicates the size of audio data of the n-th frame, and "offA[n]" indicates the address of audio data of the n-th frame. These notations are similarly used in the subsequent drawings.

Thus, when recording video and audio data based on MXF, information for respective frame of each data is recorded in the reproduction information file. When reproducing a moving image file in which video and audio data are recorded, by referring to the generated reproduction information file, the moving image file may be reproduced from a point in the middle of the file.

Figure 6:
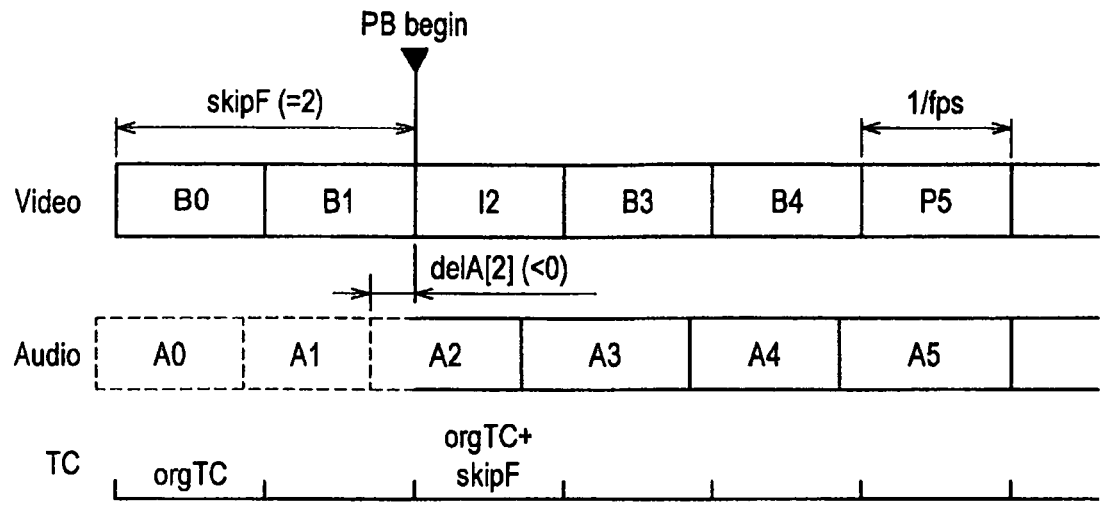
FIG. 6 is an illustration showing reproduction of video and audio data recorded based on MXF.

FIG. 6 is an illustration showing reproduction of video and audio data recorded based on MXF. "Video" indicates video frames, and "Audio" indicates audio frames, respectively. "skipF" indicates the number of frames to be skipped due to decoding failure and the like when reproducing the moving image file. "fps" indicates the number of frames to be reproduced in 1 second (frame per second), and "1/fps" indicates the amount of time for 1 frame. Incidentally, information relating to "fps" is recorded in the file header of the reproduction information file. When storing the information relating to "fps" in the reproduction information file, it may be possible to store actual values or parameters. In the present embodiment, parameter is stored in the file header of the reproduction information file.

Similarly to FIG. 5, B, I and P in the video frames respectively indicates picture type, and B0 indicates that the picture type is B and that it is the 0-th frame. A0 in the audio frame indicates that it is the 0-th frame in the audio data. Further, "TC" indicates time code, and "orgTC" indicates the initial value of time code. Values of "skipF" and "orgTC" are stored in the file header or the extended file header of the reproduction information file, and the values are read from the reproduction information file when reproducing the moving image file.

As shown in FIG. 6, in MXF, video reproduction timing and audio reproduction timing may differ (delay) at the starting point of time of reproduction (time point indicated by "PB begin" in FIG. 6). "delA[2]" in FIG. 6 indicates the audio synchronization timing in the second frame. That is, when video reproduction timing and audio reproduction timing differ as shown in FIG. 6, if reproduction of audio is delayed by the amount of "delA[2]", video and audio can be synchronously reproduced. Incidentally, in the example shown in FIG. 6, since audio is delayed compared to video, "delA[2]" shows a negative value.

Accordingly, when recording video and audio data based on MXF, delay information for respective frame of each data is recorded in the reproduction information file. And when reproducing a moving image file in which video and audio data are recorded, by referring to the delay information contained in the generated reproduction information file, video and audio can be synchronously reproduced.

Figure 7:
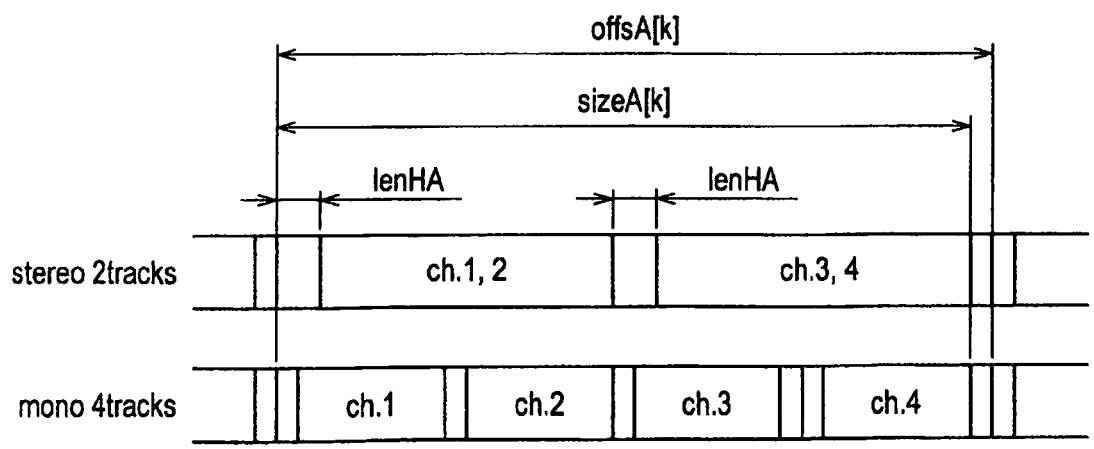
FIG. 7 is an illustration showing an example of a chunk of audio data recorded based on MXF.

FIG. 7 is an illustration showing an example of a set (chunk) of audio data recorded based on MXF. FIG. 7 explains by showing k-th frame as an example. As shown in FIG. 7, there are cases where the set of audio data recorded based on MXF uses 2 tracks in stereo ("stereo 2tracks"), or 4 tracks in monaural ("mono 4tracks").

In FIG. 7, when using 2 tracks in stereo, data is recorded with ch(channel)1 and ch2 as one set, and ch3 and ch4 as one set. Further, when using 4 tracks in monaural, data is recorded as one set in each channel. "lenHA" indicates the chunk size of audio data, and is information to be stored in the file header of the reproduction information file.

In such case, size "sizeA[k]" and relative address "offsA[k]" of audio data are recorded in the reproduction information file. And when reproducing a moving image file in which video and audio data are recorded, by referring to the generated reproduction information file, even if the moving image file is reproduced from a point in the middle of the file, the audio can be reproduced from the reproduction position.

Figures 8, 9:
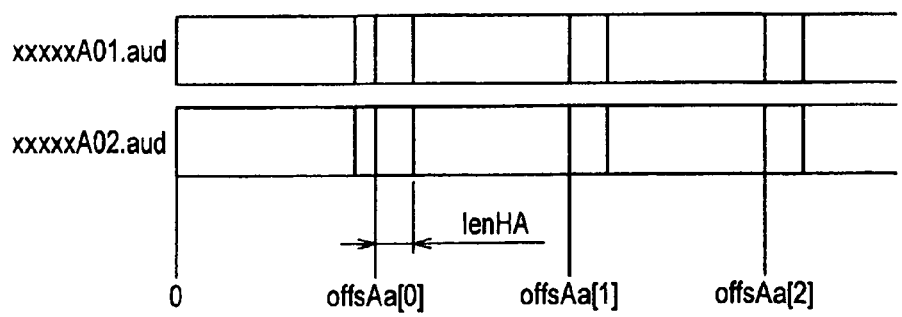
FIG. 8 is an illustration showing a data structure of a reproduction information file generated at the time of recording a moving image file based on MXF.
FIG. 9 is an illustration showing a case where audio data is recorded independently as an audio data file at the time of recording the audio data based on MXF.

FIG. 8 is an illustration showing a data structure of a reproduction information file generated at the time of recording a moving image file based on MXF.

As shown in FIG. 8, size of image data ("sizeV[ ]"), absolute address of image data ("offsV[ ]"), delay information (delA[ ]), size of audio data ("sizeA[ ]") and relative address of audio data ("offsA[ ]") are recorded for respective frames. Further, GOP top flag (1 or 0. In case of 1, it is indicated that the frame is the top of GOP) and information relating to picture types (B, P, I) are also stored.

As such, by generating a reproduction information file at the time of recording a moving image file based on MXF, even if the moving image file is reproduced from a point in the middle of the file, by referring to the information stored in the reproduction information file, video and audio can be reproduced from the reproduction position. Since the delay information of audio is also recorded in the reproduction information file, even if the moving image file is reproduced from a point in the middle of the file, by referring the reproduction information file, video and audio can be synchronized and reproduced from the reproduction position.

For example, in case of obtaining video data of the k-th frame, when the frame is an I-picture, the range of "(offsV[k]+lenHI)~(offsV[k]+sizeV[k]−1)" corresponds to the video data of the k-th frame, and when the frame is a P-picture or a B-picture, the range of "(offsV[k]+lenHV)~(offsV[k]+sizeV[k]−1)" corresponds to the video data of the k-th frame.

For example, in case of obtaining audio data of the k-th frame, unit of audio track "_lenA" is "_lenA=sizeA[k]/(trksA & 0xf)", audio data address is "offsA[k]+offsV[k]+(_lenA*j)+lenHA", and audio data length is "_lenA-lenHA". Here, "trksA" indicates the number of audio tracks and is a data to be stored in the file header of the reproduction information file.

The reproduction information file can be generated not only in the case of recording image data and audio data in one moving image file, but also in the case of recording audio data as an audio file independent from the moving image file. FIG. 9 is an illustration showing a case where audio data is recorded independently as an audio data file at the time of recording the audio data based on MXF. In the example shown in FIG. 9, audio is recorded in monochrome 2 channels with file names, "xxxxxA01.aud" and "xxxxxA02.aud", respectively.

Even in case of recording audio data as an audio file independent from a moving image file, data size and relative address of the audio data corresponding to each frame are recorded so that, even when reproduction of the moving image file is started from a point in the middle of the file, audio can be generated from the reproduction location by referring to the generated reproduction file.

Heretofore, the data structure of a reproduction information file to be generated at the time of recording a moving image file based on MXF has been described. Incidentally, RIFF (Resource Interchange File Format) has a data structure similar to that of MXF so that the index is a format identical to that of MXF, and also, the processing using the index of reproduction and the like is common with the processing in the case of MXF. When recording a moving image file based on standards other than MXF, by generating reproduction file and referring to the generated reproduction information file, reproduction of video and audio can be performed. Hereinafter, embodiments for other standards will be described.

Embodiment for MP4 Standard

Figure 10:
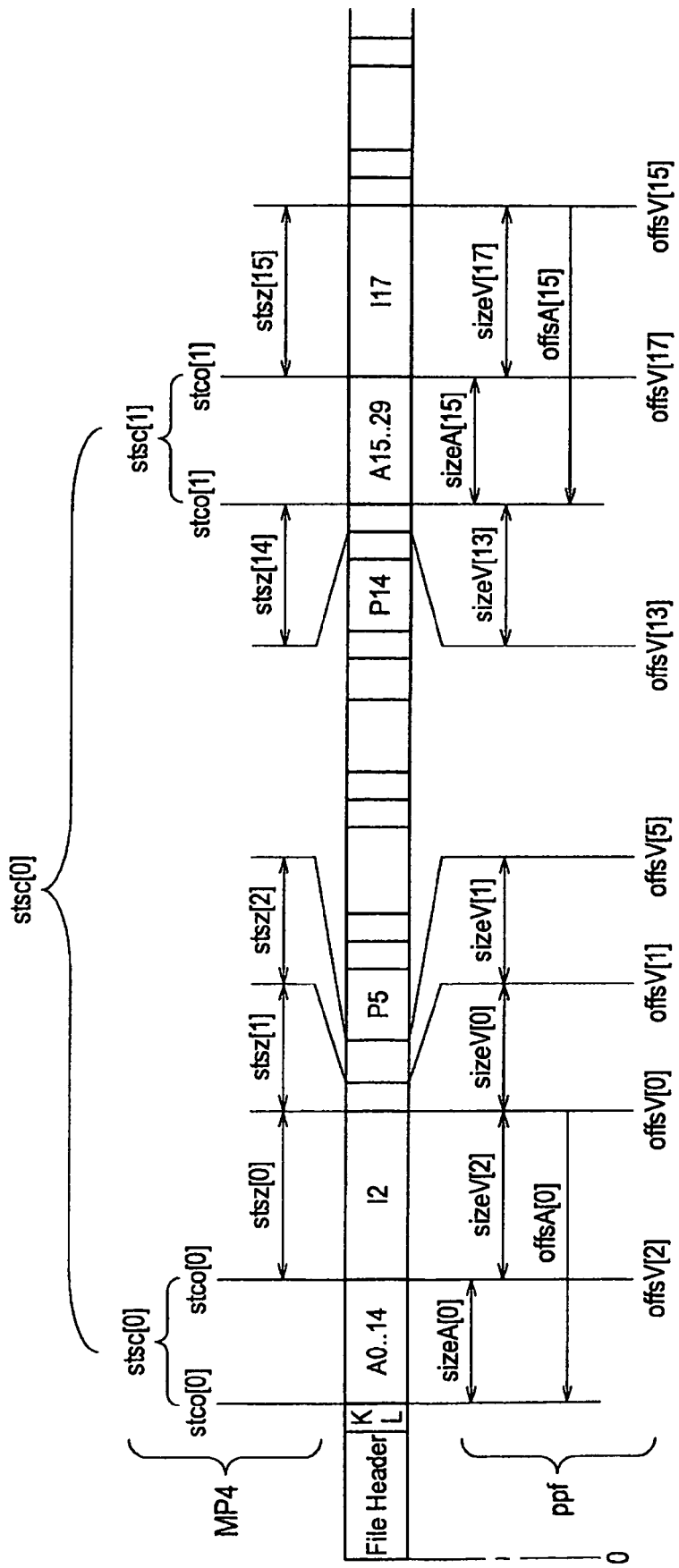
FIG. 10 is an illustration showing an example of a structure of video and audio data recorded based on MP4 standard.

FIG. 10 is an illustration showing an example of a structure of video and audio data recorded based on MP4 standard. As shown in FIG. 10, in MP4 standard, audio data (A0-A14, A15-A29, . . . ) and image data (I2, P5, P8, P11, P14, I17, . . . ) are recorded mixedly Further, audio data recorded based on MP4 standard is recorded with 15 frames as one set.

Incidentally, in FIG. 10, "stsz[ ]" indicates the size of each frame of video and audio data recorded based on MP4 standard, "stco[ ]" indicates a chunk of video and audio data, and "stsc[ ]" indicates the information relating to a chunk of video and audio data.

Figures 11, 12:
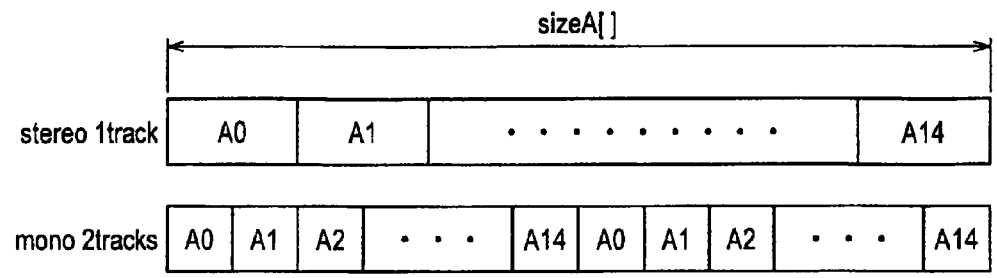
FIG. 11 is an illustration showing audio data recorded based on MP4 standard.
FIG. 12 is an illustration showing a data structure of a reproduction information file generated based on video and audio data recorded based on MP4 standard.

FIG. 11 is an illustration showing audio data recorded based on MP4 standard. As described above, audio data recorded based on MP4 standard is recorded with 15 frames as one set. In the example shown in FIG. 11, accordingly, when generating reproduction information file, data size of audio data for 15 frames is recorded.

As such, reproduction information file is generated based on video and audio data recorded based on MP4 standard. FIG. 12 is an illustration showing a data structure of a reproduction information file generated based on video and audio data recorded based on MP4 standard. As shown in FIG. 12, in a reproduction information file generated based on video and audio data recorded based on MP4 standard, size of image data ("sizeV[ ]") and absolute address of image data (offsV[ ]") of each frame are stored.

Also, as described above, audio data recorded based on MP4 standard is recorded with 15 frames as one set. Thus, audio data is recorded not by 1 frame per unit but by 15 frames per unit. That is, as shown in FIG. 12, when size of audio data ("sizeA[0]"), relative address ("offsA[0]") and delay information ("delA[0]") of audio data are stored in the place for storing information relating to audio data of frame 0, for frame 1 to frame 14, "0" is recorded in the place for storing information relating to audio data. Further, size of audio data ("sizeA[15]"), relative address ("offsA[15]") and delay information ("delA[15]") of audio data are stored in the place for storing information relating to audio data of frame 15.

As such, even in the case of generating a moving image file based on MP4 standard, reproduction information file may be generated. By recording information relating to image data and audio data of a moving image file generated by MP4 standard, even if the moving image file is reproduced from a point in the middle of the file, by referring to the reproduction information file, video and audio can be reproduced from the reproduction position. Since delay information of the audio is also recorded in the reproduction information file, even in the case of reproducing the moving image file from a point in the middle of the file, by referring to the reproduction information file, video and audio can be synchronized and video and audio can be reproduced from the reproduction position. Also, QuickTime format has a data structure similar to that of MP4 so that the index is a format completely identical to that of MP4, and also, the processing using the index of reproduction and the like is common with the processing in the case of MP4.

Embodiment for MPEG-2 TS Standard

Figure 13:
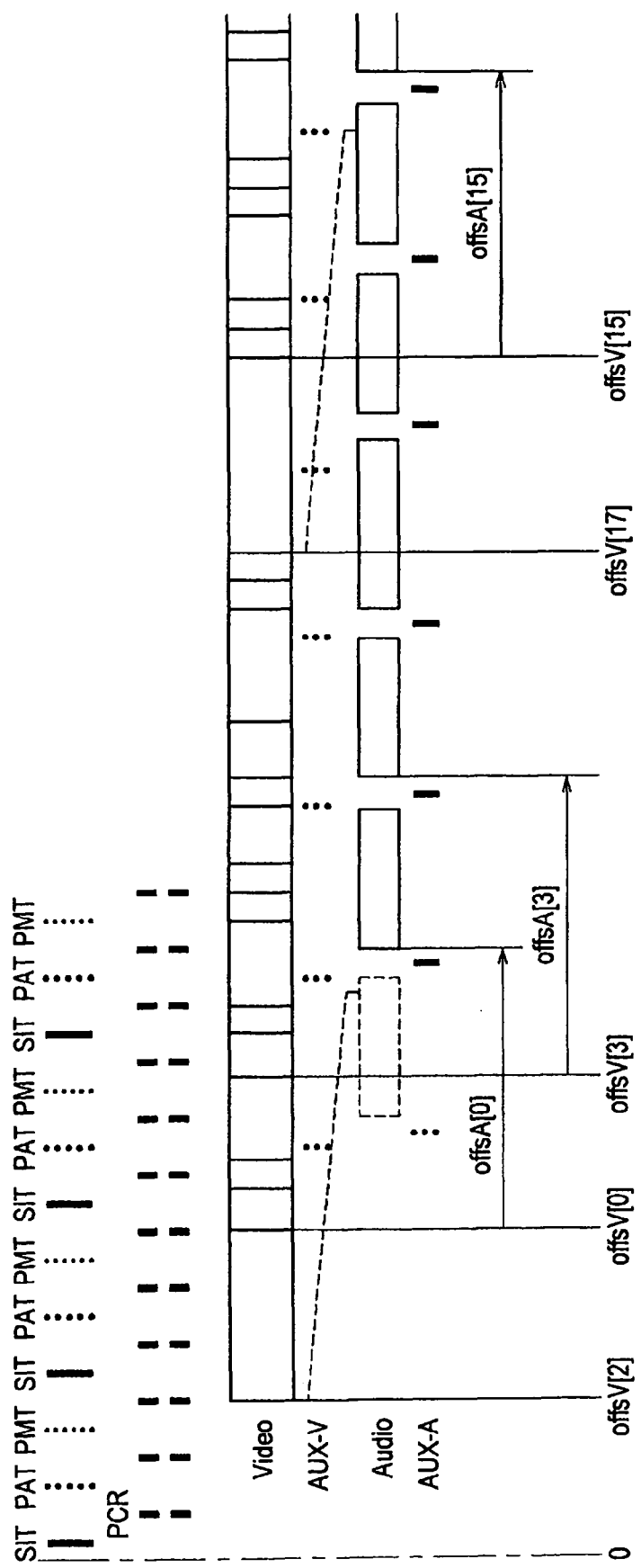
FIG. 13 is an illustration showing an example of a structure of data recorded based on MPEG-2 TS standard.

FIG. 13 is an illustration showing an example of a structure of data recorded based on MPEG-2 TS (Transport Stream) standard. As shown in FIG. 13, as data to be recorded based on MPEG-2 TS standard, aside from video and audio data, information such as SIT (Selection Information Table; information relating to instructions for information relating to television program to be transmitted), PAT (Program Association Table; information managing the content to be transmitted in streams), PMT (Program Map Table; information managing video and audio data structuring content to be transmitted in streams), and PCR (Program Clock Reference) are created.

Further, video and audio data generated based on MPEG-2 TS standard are multiplexed and recorded (AUX-V, AUX-A).

As such, even with moving image file generated based on MPEG-2 TS standard, by recording information relating to location and size of each frame of video and audio data in a reproduction information file, the moving image file can be reproduced by referring to the reproduction information file.

FIG. 14 is an illustration showing in detail the structure of audio data recorded based on MPEG-2 TS standard. As shown in FIG. 14, audio packet according to MPEG-2 TS standard are arranged by units of PES (Packetized Elementary Stream) concentrically, and further, 4-5 PES corresponding to a Video Pack are assembled to configure 1 Audio Pack. When recording audio data recorded based on MPEG-2 TS standard as reproduction information of the present invention, general description based on frame units is possible. However, in the present embodiment, the configured Audio Pack is treated as one set of audio data.

FIG. 15 is an illustration showing an example of data recorded as video and audio data based on MPEG-2 TS standard. In MPEG-2 TS and MPEG-2 PS, among video data and audio data, leading 32 bits are allocated for header. Accordingly, size of video data and audio data to be actually recorded is the size excluding the leading 32 bits.

As such, a reproduction information file is generated based on video and audio data recorded based on MPEG-2 TS standard. FIG. 16 is an illustration showing a data structure of a reproduction information file generated based on video and audio data recorded based on MPEG-2 TS standard according to one embodiment of the present embodiment.

As shown in FIG. 16, in a reproduction information file generated based on video and audio data recorded based on MPEG-2 TS standard, size of image data ("sizeV[ ]") and absolute address of image data (offsV[ ]") of each frame are stored.

Audio data is recorded not by 1 frame per unit but by 3 frames per unit. That is, as shown in FIG. 16, when size of audio data ("sizeA[0]"), relative address ("offsA[0]") and delay information ("delA[0]") of audio data are stored in the place for storing information relating to audio data of frame 0, for frame 1 or frame 2, "0" is recorded in the place for storing information relating to audio data. Further, size of audio data ("sizeA[3]"), relative address ("offsA[3]") and delay information ("delA[3]") of audio data are stored in the place for storing information relating to audio data of frame 3.

As such, even in the case of generating a moving image file based on MPEG-2 TS standard, reproduction information file may be generated. By recording in a reproduction information file information relating to image data and audio data of the moving image file generated by MPEG-2 TS standard, even if the moving image file is reproduced from a point in the middle of the file, by referring to the reproduction information file, video and audio can be reproduced from the reproduction position. Further, since delay information of the audio is also recorded in the reproduction information file, even in the case of reproducing the moving image file from a point in the middle of the file, by referring to the reproduction information file, video and audio can be synchronized using delay information of audio, and video and audio can be reproduced from the reproduction position.

Heretofore, the method for generating a reproduction information file to be generated by the reproduction information generating unit 110 according to an embodiment of the present invention has been described.

As such, by generating a reproduction information file to correspond to each standard, even with a reproducing apparatus, which performs processing such as reproduction or editing of a moving image file with standard different from the standard used at the time of recording, by referring to a reproduction information file, reproduction or editing of a moving image file can be performed. Next, a reproducing apparatus for reproducing a moving image file using reproduction information file according to an embodiment of the present invention will be described.

Figure 17:
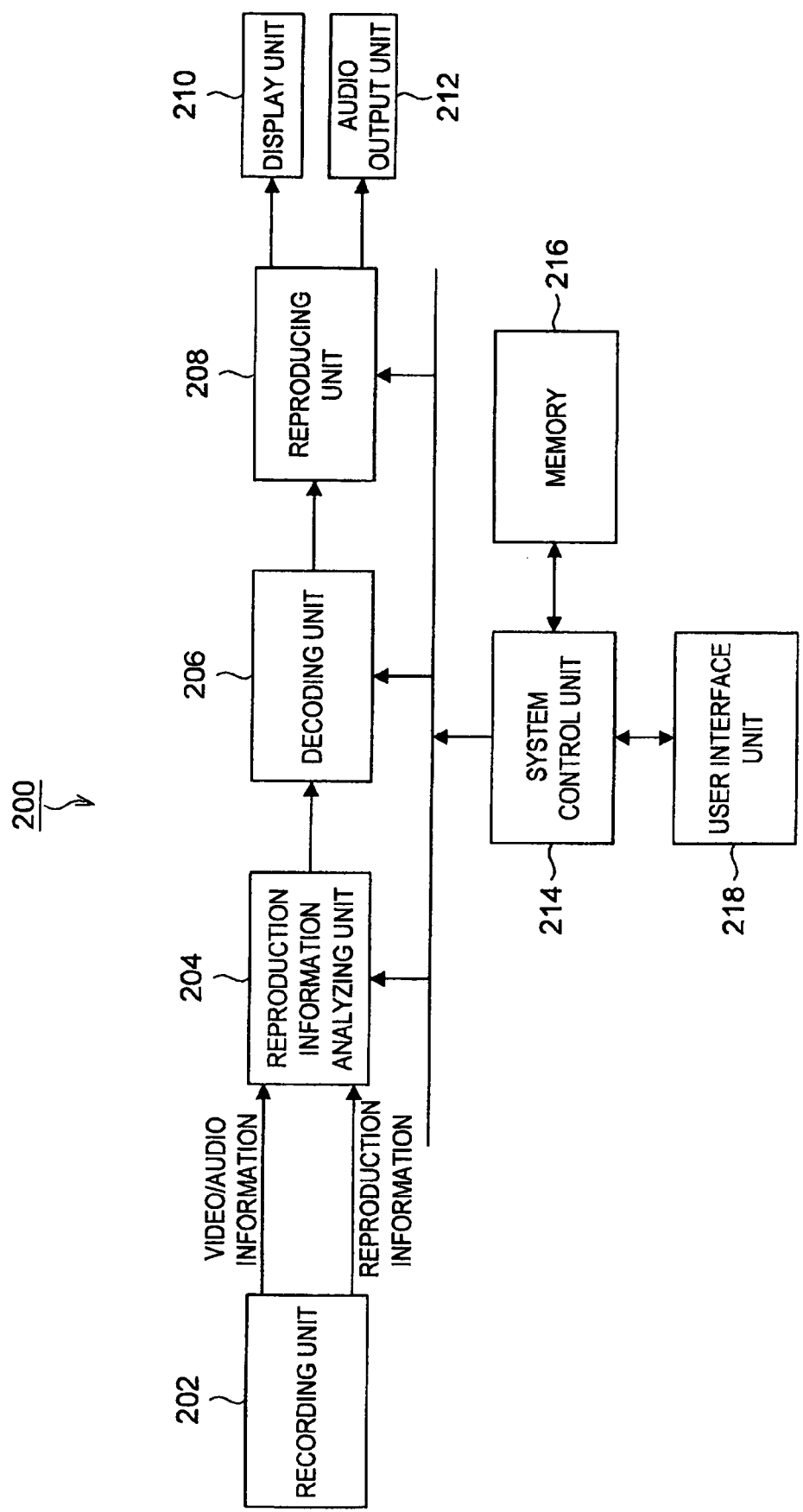
FIG. 17 is an illustration showing a reproducing apparatus 200 according to an embodiment of the present invention.

FIG. 17 is an illustration showing a reproducing apparatus 200 for reproducing a moving image file using reproduction information file according to an embodiment of the present invention. As shown in FIG. 17, the reproducing apparatus 200 according to an embodiment of the present invention is configured to include a recording unit 202, a reproduction information analyzing unit 204, a decoding unit 206, a reproducing unit 208, a display unit 210, an audio output unit 212, a system control unit 214, a memory 216, and a user interface unit 218.

The recording unit 202 records moving image file created based on a predetermined standard and reproduction information file generated based on image data and audio data of the moving image file. As examples of a predetermined standard, MXF and MP4 are known. As the recording unit 202, a hard disc drive (HDD) fixedly provided in the reproducing apparatus 200 or a recording medium to be connected to the reproducing apparatus 200 to be used, such as various memory cards, CD-ROM or DVD-ROM may be used.

The reproduction information analyzing unit 204 reads and analyzes the reproduction information file recorded in the recording unit 202. The reproduction information analyzing unit 204 receives instruction regarding reproduction starting location from the user interface unit 218 via the system control unit 214, and reads the reproduction information corresponding to the instructed reproduction starting location. The reproducing apparatus 200 reproduces the moving image file from which the reproduction information file is derived based on the reproduction information read and analyzed at the reproduction information analyzing unit 204.

For example, when instruction is given from the user interface unit 218 to reproduce a moving image file from the tenth frame, the reproduction information analyzing unit 204 is instructed from the user interface unit 218 via the system control unit 214 to obtain and analyze the reproduction information of the tenth frame.

The reproduction information analyzing unit 204 instructed to obtain and analyze the reproduction information of the tenth frame obtains from the reproduction information file the size of image data, absolute address of image data, size of audio data, relative address and delay information of audio data of the tenth frame. Based on the obtained information, reproducing location and reproducing size of image data and audio data in the moving image file are determined.

The decoding unit 206 decodes moving image file recorded in the recording unit 202. When performing decoding at the decoding unit 206, the decoding is performed based on the reproduction information analyzed by the reproduction information analyzing unit 204. For example, when instruction is given from the user interface unit 218 to reproduce a moving image file from the tenth frame, the reproduction information of the tenth frame is obtained by the reproduction information analyzing unit 204, and the decoding is performed from the tenth frame.

The reproducing unit 208 receives decoded data from the decoding unit 206 and reproduces the moving image file. Moving picture recorded in the moving image file to be reproduced is displayed on the display unit 210, and audio of the moving image file to be reproduced is output to the audio output unit 212.

The system control unit 214 controls each unit of the reproducing apparatus 200. For example, when reproduction starting location is instructed by the user interface unit 218, the system control unit 214 instructs the reproduction information analyzing unit 204 to obtain reproduction information corresponding to the reproduction starting location in the moving image file contained in the reproduction information file. Needless to say, control by the system control unit 214 is not restricted to such example.

The user interface unit 218 accepts operation at operation unit (not shown) from the user of the reproducing apparatus 200, and transmits operation signals indicating the operation to the system control unit 214. Operation by users at the operation unit includes selection of moving image file to be reproduced and designation of the reproduction starting location of the selected moving image file.

The memory 216 stores data necessary for each unit of the reproducing apparatus 200 to perform processing. For example, by storing computer program in the memory 216 and by having the system control unit 214 read out and execute the stored computer program, the moving image file may be to be reproduced.

By configuring the reproducing apparatus 200 as described above, and decoding image data and audio data from moving image file and reproduction information file at the reproducing apparatus 200, even with moving image file generated by encoding with a scheme different from that of the reproducing apparatus 200, reproduction is easily made possible. Further, since audio synchronization information is contained in the reproduction information file, by referring to the audio synchronization information, synchronization of image and audio is also made possible.

Figure 18:
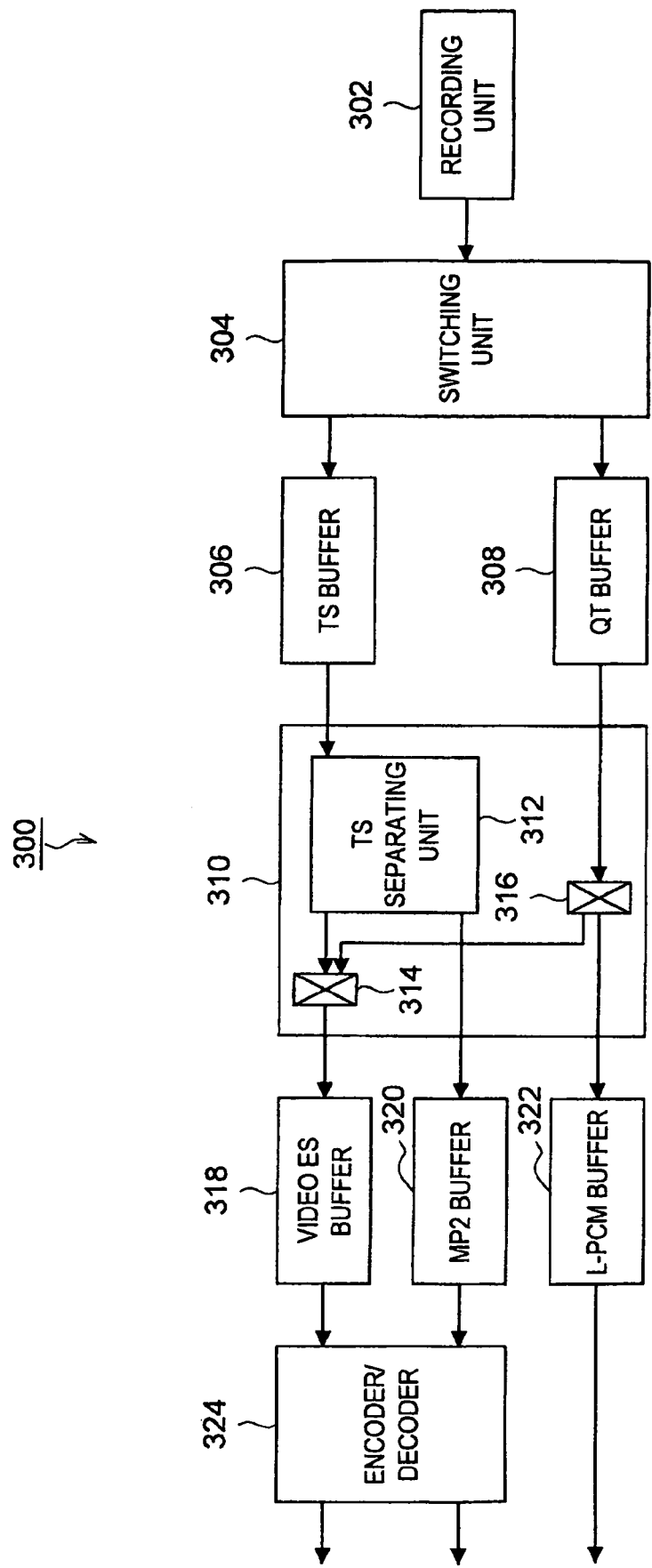
FIG. 18 is an illustration showing a reproducing apparatus 300 according to an embodiment of the present invention.

FIG. 18 is an illustration showing a reproducing apparatus 300 for reproducing moving image file using reproduction information file according to an embodiment of the present invention. As shown in FIG. 18, the reproducing apparatus 300 according to an embodiment of the present invention is configured to include a recording unit 302, a switching unit 304, a TS buffer 306, a QT buffer 308, a DSP (Digital Signal Processor) 310, a video ES buffer 318, a MP2 buffer 320, a L-PCM buffer 322, and an encoder/decoder 324.

The recording unit 302, like the recording unit 202 in the reproducing apparatus 200 as described above, records moving image file created based on a predetermined standard and reproduction information file generated based on image data and audio data of the moving image file. Examples of a predetermined standard include MXF and MP4. As the recording unit 302, a hard disc drive (HDD) fixedly provided in the reproducing apparatus 300 or a recording medium to be connected to the reproducing apparatus 300 to be used, such as various memory cards, CD-ROM or DVD-ROM may be used.

The switching unit 304 reads the moving image file recorded in the recording unit 302, and switches the destination of the data in accordance with the type of the moving image file. In the present embodiment, depending on the type of the moving image file read out, the switching unit 304 transmits the data to either the TS buffer 306 or the QT buffer 308.

When transmitting data from the switching unit 304, information relating to recording locations of image data and audio data ("offV[ ]", offA[ ]") are read from the reproduction information file, and data is obtained from moving image file based on the information read out.

The TS buffer 306 receives and temporarily stores data from the switching unit 304. Similarly, the QT buffer 308 receives and temporarily stores video and audio data from the switching unit 304.

The DSP 310 receives video and audio data temporarily stored in the TS buffer 306 and the QT buffer 308, and performs processing needed for reproduction of moving image file, such as multiplexing and separating on the received video and audio data and outputs the processed data to the video ES buffer 318, the MP2 buffer 320 and L-PCM buffer 322.

Other than the multiplexing processing and the separating processing, the DSP 310 performs on the video and audio data, processing for synchronizing video and audio. To synchronize video and audio, synchronization information in each frame recorded in the reproduction information file is being referred to. The DSP 310 is configured to include a TS separating unit 312, a multiplexer 314 and a demultiplexer 316.

The video ES buffer 318 receives and temporarily stores data output from the DSP 310. Similarly, the MP2 buffer 320 and the L-PCM buffer 322 receives and temporarily stores data output from the DSP 310.

The encoder/decoder 324 receives data from the video ES buffer 318 and the MP2 buffer 320, and decodes and outputs the received data. When performing decoding at the encoder/decoder 324, information relating to decoding method is obtained from the reproduction information file and decoding processing is performed based on the obtained decoding information.

Even in case of configuring the reproducing apparatus 300 as described above, image data and audio data from moving image file and reproduction information file at the reproducing apparatus 300 are decoded so that even with moving image file generated by encoding with a scheme different from that of the reproducing apparatus 300, reproduction is easily made possible. Further, since audio synchronization information is contained in the reproduction information file, by referring to the audio synchronization information, synchronization of image and audio is also made possible.

Heretofore, a reproducing apparatus for reproducing moving image file using reproduction information file according to an embodiment of the present invention has been described. Next, method for reproducing a moving image file according to an embodiment of the present invention will be described.

Figure 19:
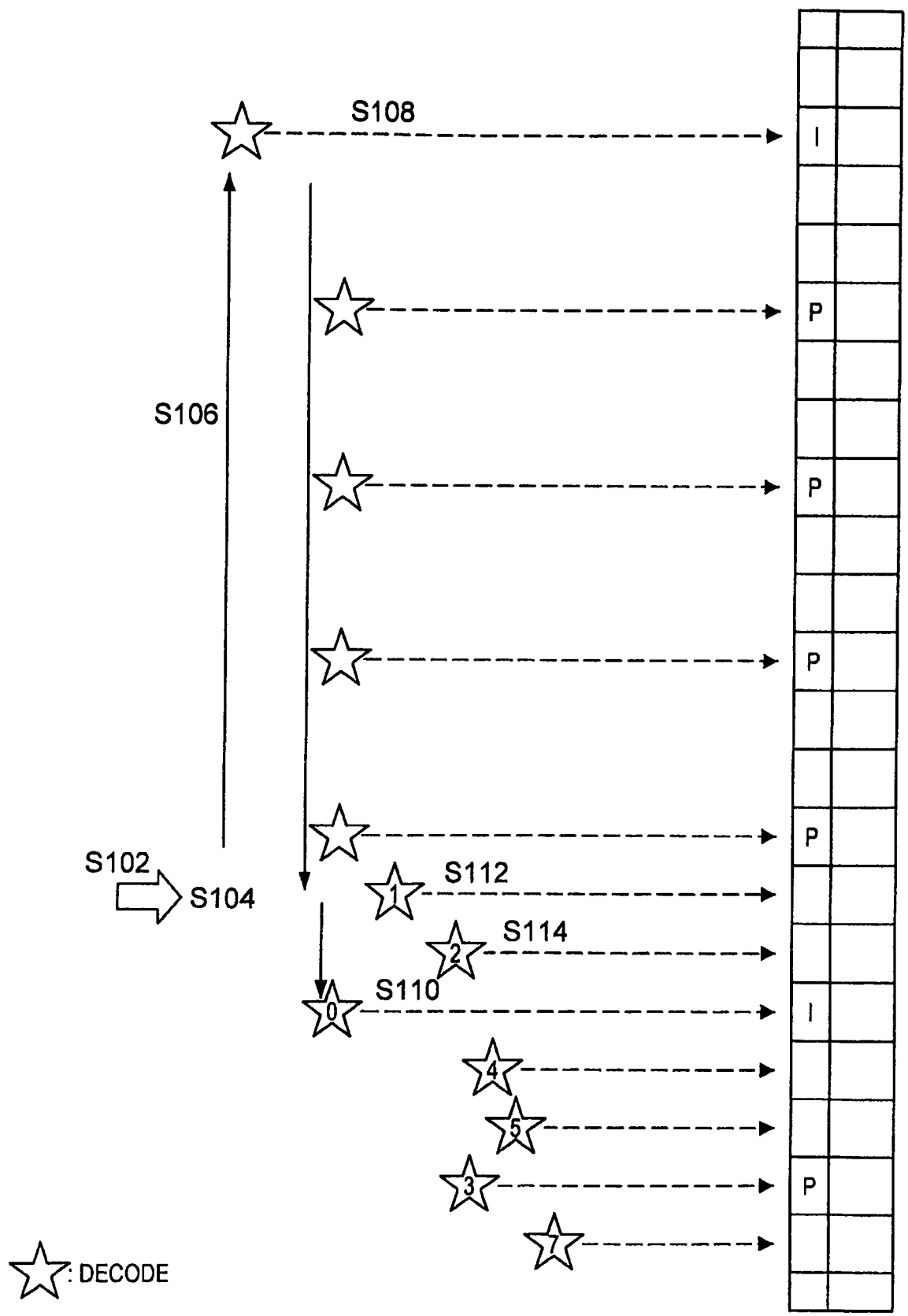
FIG. 19 is an illustration showing a method for reproducing a moving image file according to an embodiment of the present invention.

FIG. 19 is an illustration showing a method for reproducing a moving image file according to an embodiment of the present invention. Hereinafter, the method for reproducing a moving image file according to an embodiment of the present invention will be described with reference to FIG. 19. Incidentally, in the following, method for reproducing a moving image file with the reproducing apparatus 200 will be described.

First, the reproduction information analyzing unit 204 obtains the address of the f0-th frame to be cued in the reproduction information file (step S102). Since the reproduction information file is structured by 16-byte data as one set, if the frame number f0 of the frame to be cued is identified, address in the reproduction information file may be obtained. And the recorded reproduction information of the frame to be cued is read starting from the address obtained at step S102.

Subsequently, picture type contained in the reproduction information is read at the reproduction information analyzing unit 204 (step S104). There are 3 types of picture type, namely, I-picture (Intra Picture), B-picture (Bidirectionary Predictive Picture) and P-picture (Predictive Picture).

I-picture is a picture obtained by coding the entire image in the frame and is a picture to be a reference by the GOP. P-picture is a picture obtained by interframe forward prediction. B-picture is a picture obtained by forward prediction and/or reverse prediction, namely bidirectional prediction.

B-picture may be classified into 4 types of picture obtained by, namely, a coding predicting from the preceding reproduction frame (Forward predictive coding), a coding predicting from the succeeding frame (Backward predictive coding), a coding predicting from both the preceding and succeeding frames (Interpolative predictive coding) and a coding without prediction (Intra coding).

After reading the picture type at step S104, the reproduction information analyzing unit 204 determines the frame to be decoded in accordance with the read picture type. If the read picture type is an I-picture or a B-picture which is Closed B0 or Closed B1, picture type of frame numbers f0+1 and f0+2 are read (step S110). On the other hand, if the picture type is other than the above, frames are traced back until the picture type is I-picture to read the reproduction information (step S106).

Here, "Closed B0" indicates a frame to which backward predictive coding is performed where the picture type of the frame is B-picture, and indicates that the picture type of the next frame is I-picture. Further, "Closed B1" indicates a frame to which backward predictive coding is performed where the picture types of the frame and the succeeding frame are B-picture, and indicates that the picture types of the next 2 pictures are I-picture.

When the frames are traced back until the picture type is I-picture, the reproduction information of the frame is read, and based on the read reproduction information, image data is transmitted from a moving image file to the decoding unit 206 to be decoded (step S108).

When the decoding unit 206 performs decoding at step S108, the reproduction information analyzing unit 204 reads the picture types of the reproduction information from the frame to the f0-th frame. When reading through the frames, if a frame whose picture type is P-picture shows up, the reproduction information of the frame is read, and based on the read reproduction information, image data is transmitted from a moving image file to the decoding unit 206 to be decoded.

When the f0-th frame is reached, subsequently, the reproduction information analyzing unit 204 reads the picture types of frame numbers f0+1 and f0+2 (step S110). If the picture type of the frame is I-picture or P-picture, the reproduction information of the frame is read, and based on the read reproduction information, image data is transmitted from a moving image file to the decoding unit 206 to be decoded.

Subsequently, the reproduction information of the desired f0-th frame is read, and based on the read reproduction information, image data is transmitted from a moving image file to the decoding unit 206 to be decoded (step S112).

Thereafter, image data is transmitted, starting from "offsV[ ]" with the smallest value, that is image data in moving image file with the smallest absolute address, from a moving image file to the decoding unit 206 to be decoded (step S114).

On the other hand, for audio data, the reproduction information of the desired f0-th frame is read, and based on the read reproduction information, audio data is transmitted from a moving image file to the decoding unit 206 to be decoded. Synchronization of video and audio is performed by reading out the synchronization information recorded in the reproduction information of the f0-th frame ("delA[f0]") and by reflecting the synchronization information read out on the decoding result at the decoding unit 206.

As described above, by reading the reproduction information from a reproduction information file, a moving image file can be reproduced from a desired frame. Further, since audio synchronization information for synchronizing video and audio is recorded in a reproduction information file, by reading the reproduction information from a reproduction information file when reproducing a moving image file, video and audio can be synchronously reproduced.

Heretofore, the method for reproducing a moving image file according to an embodiment of the present invention has been described.

As described above, according to an embodiment of the present invention, when recording a moving picture as a moving image file at the recording/reproducing apparatus 100, a reproduction information file containing the reproduction information of the moving picture is also created. When reproducing the moving image file recorded in the recording/reproducing apparatus 100, it is reproduced referring not to information relating to reproduction contained in the moving image file but to the reproduction information file created at the recording/reproducing apparatus 100. By referring to a reproduction information file at the time of reproduction, reproduction is made possible even with a reproducing apparatus which performs decoding with standard different from that of the recording/reproducing apparatus 100.

By generating reproduction information file, various processing other than reproduction of moving image file are made possible. Examples of the processing will be described below.

Processing Example 1

Salvaging

Based on reproduction information also generated at the time of recording by the recording/reproducing apparatus 100, in a case such as power is cut off due to battery exhaustion and the like and the recording is not terminated normally, moving image file may be restored from information for each frame contained in the generated reproduction information.

Processing Example 2

Splitting

By using reproduction information file also generated at the time of generating moving image file by the recording/reproducing apparatus 100, moving image file can be split. Split point is determined using reproduction information file, and then, the reproduction file itself is split. Stream portion of moving image file is split and partially replicated in accordance with the split reproduction information file. Thereafter, by performing recording termination processing on each of the split moving image file, 2 moving image files are completed.

Incidentally, at the time of splitting, in some cases, it is needed to decode frames that need not be displayed, in which case, a predetermined length of overlapping portion is provided to be split. In doing so, by providing the reproduction information file with a predetermined length of overlapping portion and thereby splitting it, splitting of moving image file is made possible.

Processing Example 3

Creation of Reproduction File from a Moving Image File

When moving image file without reproduction information file is assigned to the recording/reproducing apparatus 100, index information specified by each wrapper method may be read to be converted to reproduction information file. By using the reproduction information file obtained by conversion, normal reproduction, cueing, or further, splitting may be realized with the same processing as with a moving image file containing reproduction information file.

As described above, according to an embodiment of the present invention, reproduction information file is also created at the time of creating moving image file. Standard of the moving image file, basic information of the moving image file, information of each frame, such as size and address, synchronization information for synchronizing video and audio are recorded in the reproduction information file. When reproducing or editing the moving image file, it is reproduced referring not to index information recorded in the moving image file but to the reproduction information file, thereby making it possible to reproduce or edit with standard different from that of the moving image file with ease. As a result, even with system handling different standard, by referring to the reproduction information file, system corresponding to multi-format can be realized.

It should be understood by those skilled in the art that various modifications, combinations, sub-combinations and alterations may occur depending on design requirements and other factors insofar as they are within the scope of the appended claims or the equivalents thereof.

For example, in the above-described embodiments, when creating reproduction information file at the time of creating moving image file at the recording/reproducing apparatus 100, reproduction information is added and recorded in the DRAM 111 at predetermined intervals, and when the recording is over, reproduction information file is created from the reproduction information recorded in the DRAM 111. However, the present invention is not restricted to such example. When creating reproduction information file at the time of creating moving image file at the recording/reproducing apparatus 100, it may be created in the form of reproduction information file, which is repeatedly opened and closed so that reproduction information may be added.

What is claimed is:

1. A recording method, comprising:
an image recording step of recording moving picture;
an audio recording step of recording audio; and
a reproduction information recording step of recording reproduction information for reproducing said moving picture and said audio together with, at the time of recording said moving picture recorded in said image recording step and said audio recorded in said audio recording step, wherein
said reproduction information includes audio synchronization information for each chunk of audio data, and for a respective frame or frames (i) a group of picture (GOP) top flag which indicates whether or not the respective frame is a top or first frame in the respective GOP, (ii) picture type information which indicates whether the respective frame is an I-picture, a P-picture, or a B-picture, (iii) size of the audio data, (iv) relative or absolute address of the audio data, (v) delay information of the audio data which represents a time delay between the respective audio data and a corresponding portion of the moving picture, (vi) size of moving picture data, and (vii) absolute address of the moving picture data, such that said reproduction information recording step records, for said each chunk of audio data, the audio synchronization information for synchronizing moving picture and audio, in parallel with said reproduction information at the time of recording said reproduction information, and records the group of picture (GOP) top flag, the picture type information, the audio synchronization information for said each chunk of audio data, the size of audio data, the relative or absolute address of the audio data, the delay information of the audio data, the size of moving picture data, and the absolute address of the moving picture data for the respective frame or frames, and wherein said reproduction information further includes information corresponding to number of frames skipped, number of frames to be reproduced, and frame number of image to be used in a list of thumbnail images.

2. A non-transitory computer readable memory having stored therein a computer program for enabling a computer to execute processing that includes:
an image recording step of recording moving picture;
an audio recording step of recording audio; and
a reproduction information recording step of recording reproduction information for reproducing said moving picture and said audio together with, at the time of recording said moving picture recorded in said image recording step and said audio recorded in said audio recording step, wherein
said reproduction information includes audio synchronization information for each chunk of audio data, and for a respective frame or frames (i) a group of picture (GOP) top flag which indicates whether or not the respective frame is a top or first frame in the respective GOP, (ii) picture type information which indicates whether the respective frame is an I-picture, a P-picture, or a B-picture, (iii) size of the audio data, (iv) relative or absolute address of the audio data, (v) delay information of the audio data which represents a time delay between the respective audio data and a corresponding portion of the moving picture, (vi) size of moving picture data, and (vii) absolute address of the moving picture data, such that said reproduction information recording step records, for said each chunk of audio data, the audio synchronization information for synchronizing moving picture and audio, in parallel with said reproduction information at the time of recording said reproduction information, and records the group of picture (GOP) top flag, the picture type information, the audio synchronization information for said each chunk of audio data, the size of audio data, the relative or absolute address of the audio data, the delay information of the audio data, the size of moving picture data, and the absolute address of the moving picture data for the respective frame or frames, and wherein said reproduction information further includes information corresponding to number of frames skipped, number of frames to be reproduced, and frame number of image to be used in a list of thumbnail images.

3. A recording apparatus, comprising:
an image recording unit to record moving picture;
an audio recording unit to record audio; and
a reproduction information recording unit to record reproduction information for reproducing said moving picture and said audio together with, at the time of recording said moving picture and said audio, wherein
said reproduction information includes audio synchronization information for each chunk of audio data, and for a respective frame or frames (i) a group of picture (GOP) top flag which indicates whether or not the respective frame is a top or first frame in the respective GOP, (ii) picture type information which indicates whether the respective frame is an I-picture, a P-picture, or a B-picture, (iii) size of the audio data, (iv) relative or absolute address of the audio data, (v) delay information of the audio data which represents a time delay between the respective audio data and a corresponding portion of the moving picture, (vi) size of moving picture data, and (vii) absolute address of the moving picture data, such that said reproduction information recording unit records, for said each chunk of audio data, the audio synchronization information for synchronizing moving picture and audio, in parallel with said reproduction information at the time of recording said reproduction information, and records the group of picture (GOP) top flag, the picture type information, the audio synchronization information for said each chunk of audio data, the size of audio data, the relative or absolute address of the audio data, the delay information of the audio data, the size of moving picture data, and the absolute address of the moving picture data for the respective frame or frames, and wherein said reproduction information further includes information corresponding to number of frames skipped, number of frames to be reproduced, and frame number of image to be used in a list of thumbnail images.

* * * * *